US006811189B1

(12) United States Patent
DeLange et al.

(10) Patent No.: US 6,811,189 B1
(45) Date of Patent: Nov. 2, 2004

(54) CORROSION SEAL FOR THREADED CONNECTIONS

(75) Inventors: Richard W. DeLange, Kingwood, TX (US); Merle E. Evans, Spring, TX (US); Richard C. Griffin, Houston, TX (US); William W. Starodub, Spring, TX (US); Gregory K. Otten, Houston, TX (US); Donna S. Anderson, Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 09/679,470

(22) Filed: Oct. 4, 2000

(51) Int. Cl.[7] .............................................. F16L 25/00
(52) U.S. Cl. ...................... 285/333; 285/89; 285/332.1; 285/334; 285/355; 285/918
(58) Field of Search ................................ 285/333, 334, 285/333.1, 355, 918, 89

(56) References Cited

U.S. PATENT DOCUMENTS

| | | | | |
|---|---|---|---|---|
| 1,590,357 A | * | 6/1926 | Feisthamel | 285/332.1 |
| 2,110,825 A | * | 3/1938 | Archer | 285/113 |
| 2,150,221 A | * | 3/1939 | Hinderliter | 285/332.3 |
| 2,380,690 A | * | 7/1945 | Graham | 285/114 |
| 2,825,585 A | * | 3/1958 | Griffin | 285/333 |
| 2,980,451 A | * | 4/1961 | Taylor et al. | 285/333 |
| 3,079,181 A | * | 2/1963 | Van Der Wissel | 285/333 |
| 3,361,453 A | * | 1/1968 | Brown et al. | 285/333 |
| 3,608,933 A | * | 9/1971 | Lee | 285/39 |
| 4,082,326 A | * | 4/1978 | Bryson | 285/238 |
| 4,209,193 A | * | 6/1980 | Ahlstone | 285/309 |
| 4,534,585 A | * | 8/1985 | Saliger | 285/92 |
| 4,595,219 A | * | 6/1986 | Lenze et al. | 285/333 |
| 4,613,161 A | * | 9/1986 | Brisco | 285/18 |
| 4,643,467 A | | 2/1987 | Wood | |
| 4,696,498 A | * | 9/1987 | Church | 285/334 |
| 4,703,959 A | * | 11/1987 | Reeves et al. | 285/332.3 |
| 4,706,997 A | * | 11/1987 | Carstensen | 285/13 |
| 4,707,001 A | * | 11/1987 | Johnson | 285/332.3 |
| 4,711,474 A | * | 12/1987 | Patrick | 285/332.2 |
| 4,770,448 A | * | 9/1988 | Strickland et al. | 285/333 |
| 4,801,160 A | * | 1/1989 | Garrington | 285/81 |
| 4,878,285 A | * | 11/1989 | Carstensen | 29/451 |
| 4,917,409 A | * | 4/1990 | Reeves | 285/334 |
| 4,958,862 A | * | 9/1990 | Cappelli et al. | 285/334 |
| 4,988,127 A | * | 1/1991 | Cartensen | 285/94 |
| 5,083,821 A | * | 1/1992 | Friend | 285/355 |
| 5,092,635 A | * | 3/1992 | DeLange et al. | 285/334 |
| 5,423,579 A | * | 6/1995 | Blose et al. | 285/334 |
| 5,505,502 A | | 4/1996 | Smith et al. | |
| 5,687,999 A | * | 11/1997 | Lancry et al. | 285/333 |
| 5,931,511 A | * | 8/1999 | DeLange et al. | 285/334 |

FOREIGN PATENT DOCUMENTS

GB        0846748 A   *   8/1960           285/333

* cited by examiner

*Primary Examiner*—Daniel P. Stodola
*Assistant Examiner*—Carlos Lugo
(74) *Attorney, Agent, or Firm*—Browning Bushman; Carlos Torres; Jeffery E. Daly

(57) ABSTRACT

The threaded connection between the pin and the box ends of two pipes is sealed externally and internally to protect the threads in the connection from exposure to corrosive fluids. Seals are provided at each axial end of the threads. The external seals may be formed by metal-to-metal engagement between the pin and box or may be provided by an annular, elastomeric ring engaging the pin and box of the connection. A threaded compression ring may be used to compress the elastomeric seal between the pin and box. The seals protect dynamically loaded threaded connections from fatigue-induced failure in corrosive environments.

7 Claims, 3 Drawing Sheets

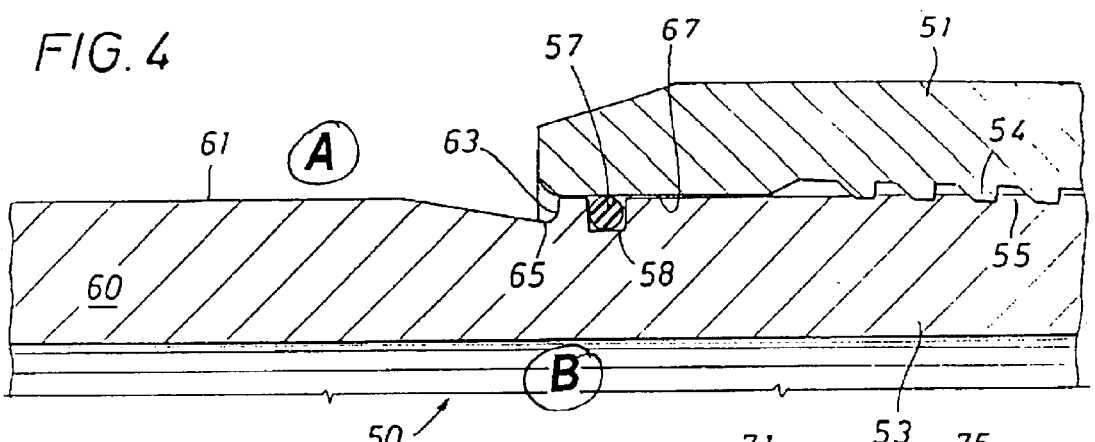
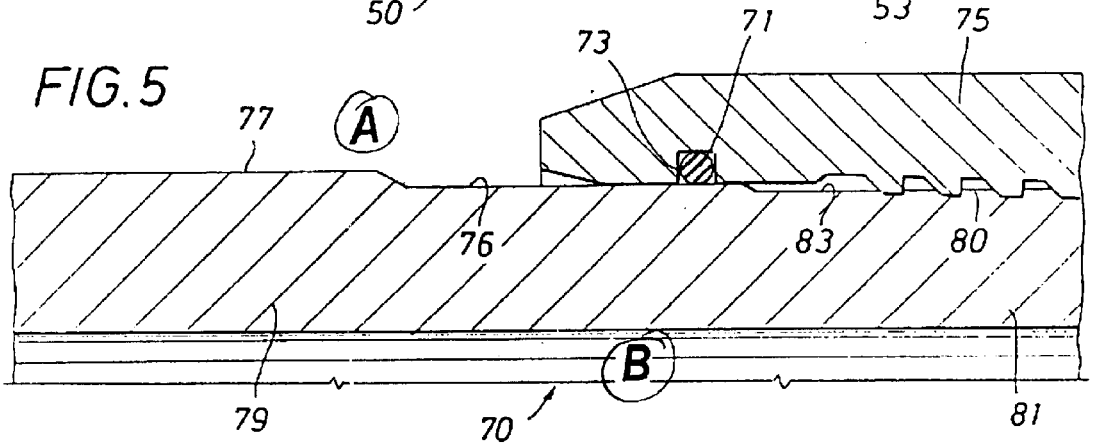
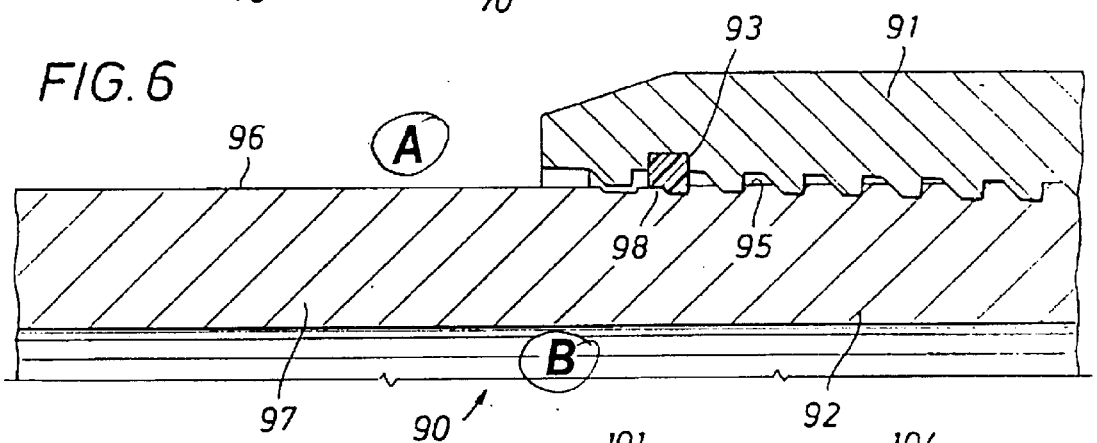
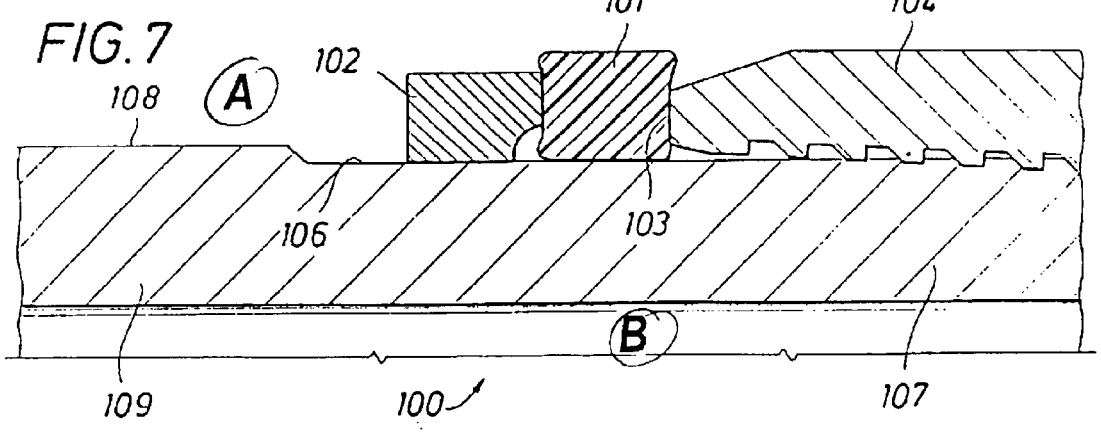

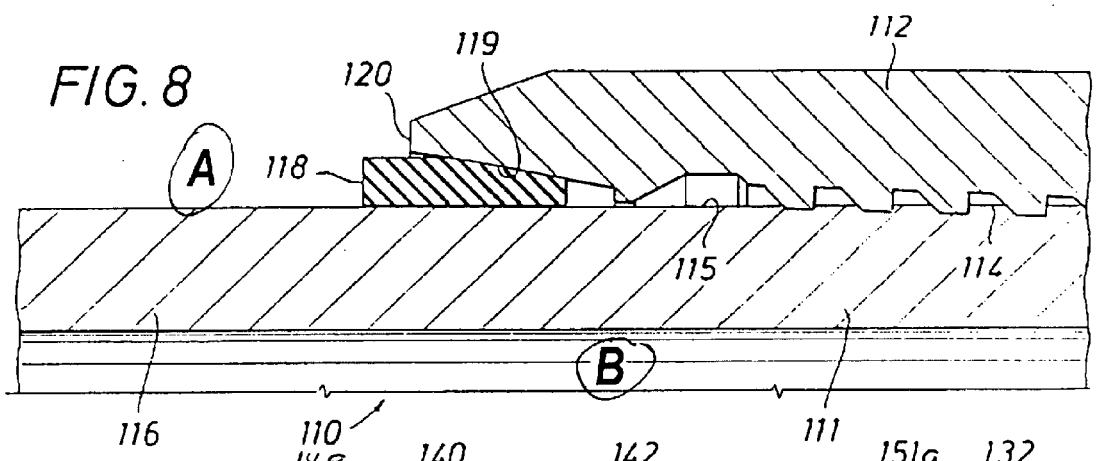
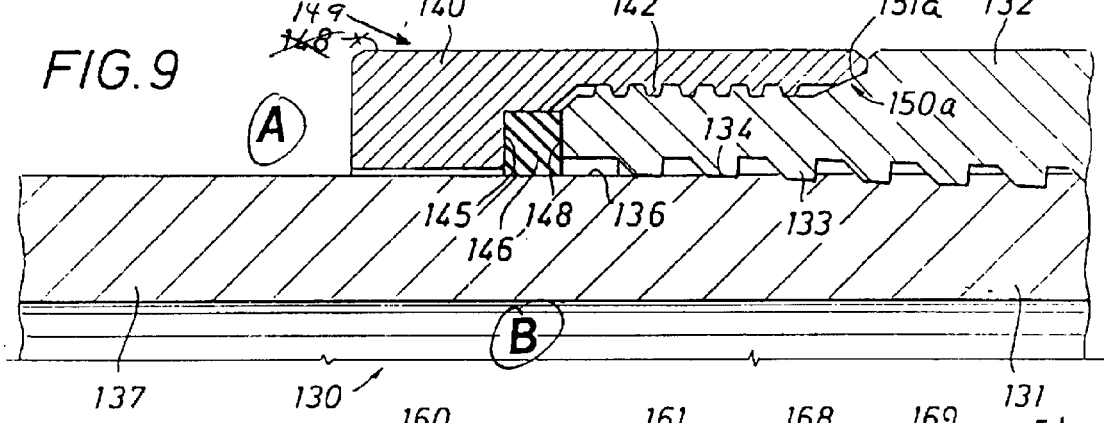
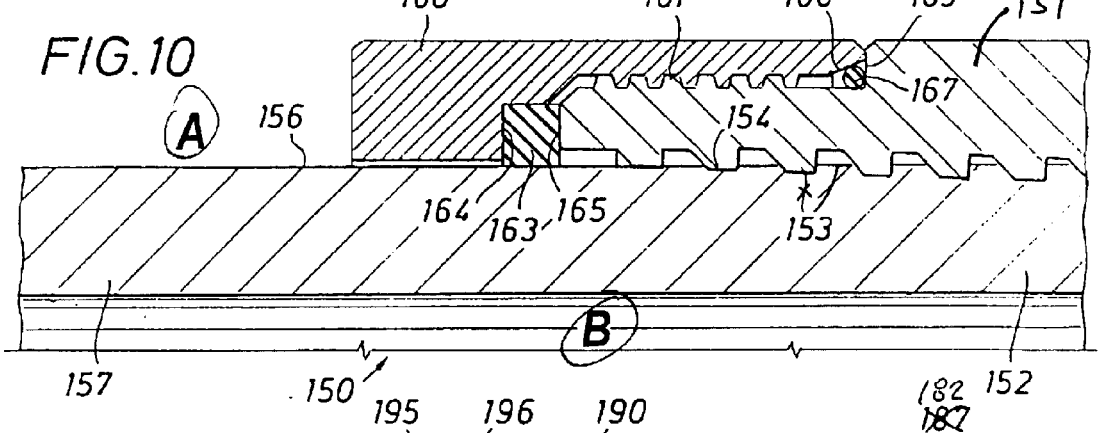
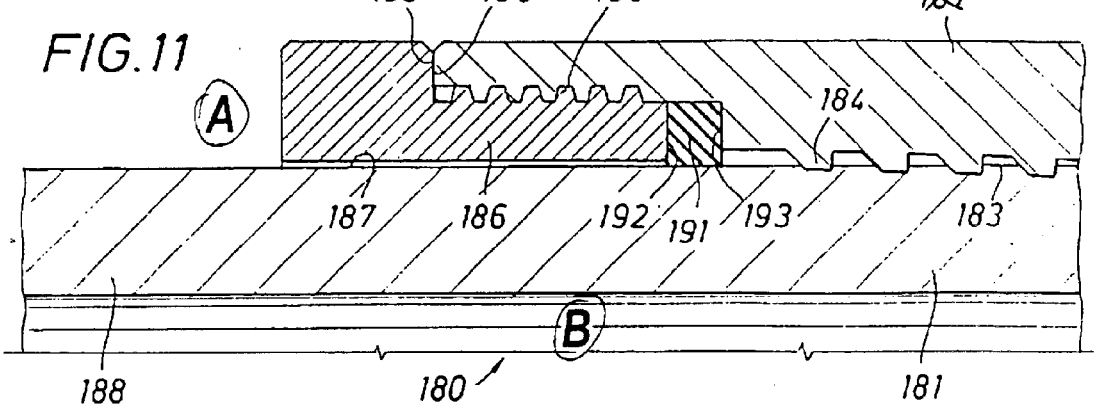

CORROSION SEAL FOR THREADED CONNECTIONS

BACKGROUND OF THE INVENTION

1. Field of the Invention

The present invention relates to threaded connectors used to secure the ends of tubular bodies together. More particularly, the present invention relates to threaded connections provided with seals to protect the threads in pipe connections from exposure to corrosive fluids.

2. Setting of the Invention

Pipelines that extend through saltwater bodies are employed for multiple purposes, often associated with the drilling of oil and gas wells and the production and distribution of the oil and gas produced by the wells. When the pipelines are not buried or otherwise solidly anchored within the saltwater body, they are subjected to dynamic loadings that can eventually cause the pipelines to rupture or otherwise fail. The stresses induced by dynamic loading in the connections of the individual tubular bodies forming the pipeline are of particular concern.

Jointed pipelines that are secured together by the threaded engagement of pin and box connectors at the ends of individual pipe sections are employed in marine riser pipes as well as submerged pipelines and other bottom-to-surface supply lines. The marine riser pipelines are typically constructed of tubular pipe sections that are secured together at their ends by special connectors designed to withstand the destructive effects of the dynamic loading acting on the riser. The dynamic loading of the riser is caused by changing sea currents, changes in surface exerted tension resulting from wind and wave action against a surface support of the riser, and other factors.

The effects of dynamic loading on the connections used in marine applications may be offset, in part, by the use of connectors that have the strength required to withstand the forces imparted by the environment. Conventional riser connections typically employ heavy tool joint type connections that are welded onto the end of the pipe. These connections are very resistant to fatigue damage and typically employ a metal-to-metal torque shoulder as an external seal, similar to the design employed in a conventional drill pipe tool joint. Connections of this type have a very low stress concentration factor (SCF) and provide an environmental seal that prevents the seawater from contacting the threads in the connection.

The tool joint design is expensive to machine and requires the added step and expense of welding the connector to the pipe. The welding procedure also introduces a potential point of fatigue failure for the dynamically loaded connector. Moreover, as compared with a conventional threaded and coupled connection, the tool joint type connection is extremely heavy, requiring additional surface support.

Conventional threaded and coupled connections have been successfully employed as the outer riser in a marine installation for short time periods. Such connections cost less than ⅙ the cost of tool joint type connectors. The long-term reliability of these conventional connections in a saltwater environment under dynamic loading conditions, however, is not reasonably predictable. The problem stems from the fact that, when used as risers, the threads of conventional threaded and coupled connectors are exposed to salt water that can accelerate corrosion of the threaded area. The dynamic loading of the riser constantly flexes the connections laterally and imposes cyclical tension and compression stresses. The unengaged pin threads that have been machined into the pipe are exposed to the salt water. These exposed threads concentrate the stresses exerted on the pipe. Adding the effects of corrosion to the cyclical stress concentration unreasonably exposes the connection to a fatigue induced failure that will generally occur in the area of the last full. thread formed on the bore of the pin member of the connection.

The strength of a standard threaded and coupled connection is optimized by forming the pin threads such that the thread roots "run out" or continue to decrease in depth on the external surface of the pipe until they disappear at a point referred to as the "last scratch." The final turns of the threads do not make a full depth cut into the pipe body and are not normally intended to be engaged and covered by threads in the mating coupling. From the point of the last full threaded engagement with the box threads to the last scratch of the pin threads, the pin threads in a conventional threaded and coupled connection are exposed to the surrounding environment. The corrosive effects of saltwater in this area of exposure can accelerate the failure of a connector subjected to cyclical, dynamically induced forces.

From the foregoing, it will be appreciated that a general object of the present invention is to prevent contact of the threads of a dynamically loaded connector with the corrosive fluids surrounding the connector.

A primary object of the present invention is to protect the exposed external pin threads in conventionally threaded connections of dynamically loaded pipe strings disposed in a body of saltwater.

Yet another object of the present invention is to provide a thread configuration on a non-upset pin that is sealed away from corrosive fluids to protect the pin from fatigue damage induced by cyclical, dynamic loading of the pin.

An important object of the present invention is to protect a conventionally threaded and coupled connection from the effects of saltwater exposure to the pin to prevent fatigue-induced damage when the connection is subjected to dynamic loading.

A related object of the present invention is to provide a marine riser pipe that weighs substantially less than a marine riser constructed with conventional tool joint type connections.

Yet another object of the present invention is to provide a marine pipeline that can withstand dynamic loading in a corrosive environment without the need for heavy, tool joint type connectors.

An object of the present invention is to provide a threaded pin connector that may be subjected to dynamic loading in a marine environment wherein the pin to the thread configuration redirects the imposed loads away from the last thread scratch area to minimize fatigue damage in the pin connection.

An object of the present invention is to protect the normally exposed pin threads in a pin and box connection from contact with corrosive fluid by providing an external metal-to-metal seal between the pin and box of the connection.

Yet another object to the present invention is to protect the normally exposed pin threads in a pin and box connection from contact with corrosive fluids by providing an external elastomeric seal between the pin and box of the connection.

It is also an object of the present invention to provide an external seal for protecting the normally exposed threads on a pin and box connection with a compression ring that actuates a protective seal between the pin and box without inducing significant mechanical stress in the connection.

Another object of the present invention is to provide a compression ring that encircles a pin and engages auxiliary threads on a box to advance the ring toward the box and compress an elastomeric seal between the box and pin whereby the normally exposed pin threads in the connection are isolated from contact with corrosive fluids.

An object of the present invention is to provide a compression ring that encircles the pin of a pin and box connector and is threadedly secured to threads formed on the external surface of the box whereby rotation of the compression ring compresses an annular, elastomeric seal between the pin and box to protect the normally exposed pin threads from contact with salt water. A related object of the present invention is to provide a compression ring that mates with threads formed on the internal surface of the coupling to compress the elastomeric seal ring.

SUMMARY OF INVENTION

The normally exposed pin runout threads on fully engaged, threaded and coupled connections are sealed from saltwater to prevent corrosion of the threaded area that can accelerate fatigue-induced failure in dynamically loaded pipelines. The seals may be employed with conventional threaded and coupled connectors permitting the fabrication of pipelines that are inexpensive and lightweight as compared with pipelines constructed with conventional tool joint type connectors.

The protective seal designs of the present invention permit the use of connections having runout threads that exhibit superior load-bearing characteristics in dynamically stressed applications.

An important feature of the present invention is that the pin connectors may be fabricated on the ends of non-upset pipe eliminating the expense and weight of conventional marine connectors.

Standard marine riser connections frequently include special groove designs and other connection configurations that redirect forces away from the areas of the pin most susceptible to fatigue induced failures resulting from cyclical, dynamic loading. Because they are protected from the effects of corrosive fluids surrounding the riser connections, the connectors of the present invention may employ the inherent force redirection effects of an inexpensive, conventional pin runout thread to achieve similar results.

The external seal portion of the present invention may be provided by metal-to-metal engagement between the pin and box or by an elastomeric annular seal compressed between the pin and box. The metal-to-metal external seal may be provided by engagement of the face of the box with a shoulder formed on the pin end of a non-upset pipe. The shoulder may be provided by an enlargement of the pin outside diameter. Where an annular, elastomeric seal is provided, the seal may be carried on the outer surface of the pin body or may be disposed in the box of the connector.

One form of the invention employs a compression ring threaded to the box to effect an external seal preventing salt water from contacting the normally exposed pin threads in a conventional threaded and coupled connection. The compression ring actuates an annular, elastomeric seal ring that isolates the normally exposed pin threads from saltwater contact. The compression ring cooperates with a second seal that protects the seal ring threads from saltwater exposure. The second seal may be either a metal-to-metal seal or an elastomeric seal. The seal ring provides the desired sealing of the exposed pin threads without imposing any structural stresses in the connection.

The foregoing objects and features of the present invention, as well as others, will be more fully understood and better appreciated by reference to the following drawings, written description and claims.

BRIEF DESCRIPTION OF THE DRAWINGS

FIG. 4 is an enlarged cross sectional view of a modified form of an external seal of the connector of the present invention illustrating a pin of the connector carrying an elastomeric external seal and provided with a load redirection groove;

FIG. 5 is an enlarged cross sectional view of a modified form of an external seal of the connector of the present invention illustrating a box of the connector carrying an elastomeric annular seal engaging a reduced diameter section of a pin;

FIG. 6 is an enlarged cross sectional view of a modified form of an external seal of the connector of the present invention illustrating a box of the connector carrying an elastomeric annular seal engaging the runout area of threads on a pin;

FIG. 7 is a cross sectional view of a modified form of an external seal of the connector of the present invention illustrating an annular, elastomeric seal compressed between the face of the box and a metal annular ring secured to the pin;

FIG. 8 is a cross sectional view of yet another modified form of the present invention illustrating a frustoconical internal seal surface at the face of a box for engaging and compressing an annular, elastomeric seal against the external surface of the pin to provide an external seal;

FIG. 9 is a cross sectional view of a modified form of a connector of the present invention illustrating a compression ring threaded onto the end of a box, with elastomeric and metal-to-metal seals protecting the pin threads and the compression ring threads from contact with corrosive fluids;

FIG. 10 is a cross sectional view of a modified form of a connector of the present invention illustrating a compression ring threaded onto the end of a box with elastomeric seals protecting both the pin threads and the compression ring threads from contact with corrosive fluids; and FIG. 11 is a cross sectional view of a modified form of a connector of the present invention illustrating a compression ring threadedly secured to internally formed threads in the coupling used to form an external seal to protect the pin threads of the connection.

DESCRIPTION OF THE ILLUSTRATED EMBODIMENTS

Figure 1:
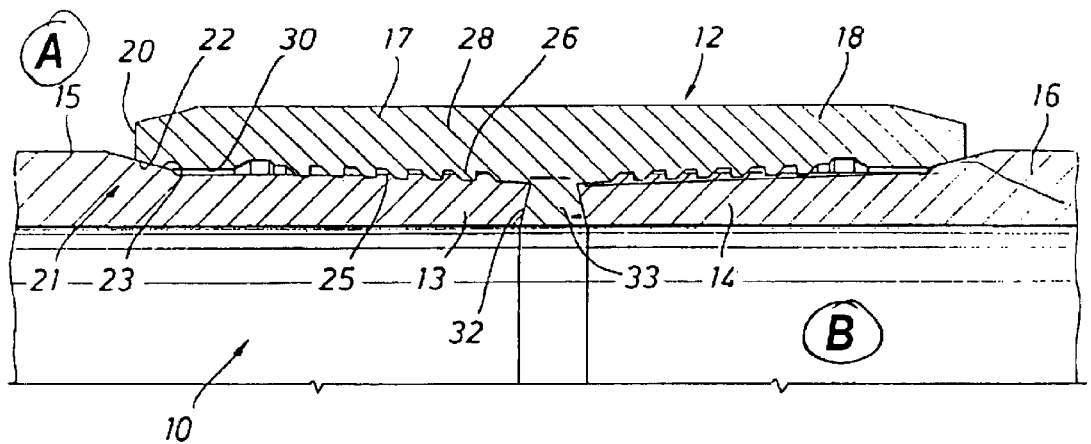
FIG. 1 is to a partial cross sectional view of a connector of the present invention formed by the threaded engagement of two pipe ends within a coupling forming two pin and box connections.

FIG. 1 illustrates a conventional threaded and coupled connection of the present invention, indicated generally at 10. The connection 10 includes a coupling indicated generally at 12 secured at its free ends to the free pin end of pins 13 and 14 formed at the ends of adjoined pipe segments 15 and 16, respectively. The threaded and coupled connection 10 is comprised of separate threaded connections formed at each end of the coupling 12. The coupling 12 provides a box end 17 that cooperates with the pin 13 to provide a first pin and box connection. Similarly, a box 18 at the opposite end of the coupling 12 cooperates with the pin 14 to provide a second pin and box connection.

Figure 2:
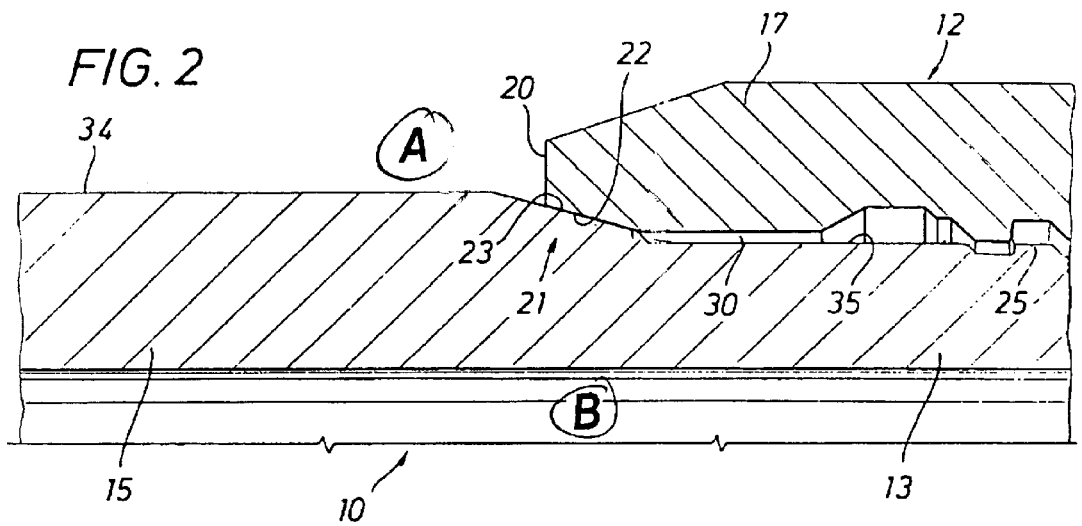
FIG. 2 is an enlarged cross sectional view illustrating details in the metal-to-metal engagement of the external seal of the connector of FIG. 1.

The detailed description that follows is directed to the pin and box connection formed by the pin 13 and box 17, which in all respects is similar to that of the connection provided by the pin 14 and box 18. Reference is made jointly to FIGS. 1 and 2.

The box 17 terminates at one axial end 20 where it engages and seals against the body of the pipe section 15 to form a metal-to-metal seal indicated generally at 21. The seal engagement surface of the box 17 is provided by an internal, frustoconical seal surface 22 adjacent the face of the coupling end 20. The seal engagement surface of the pipe section 15 is provided by a frustoconical seal surface 23 formed along the external surface of the pipe.

The pin 13 is provided with external threads 25 that engage and mate with internal threads 26 formed within the box 17. At the point 28, engagement of the threads 25 and 26 terminates leaving a gap 30 in which the run out threads of the pin are exposed. At the appropriate makeup position between the pin 13 and box 17, the metal-to-metal seal 21 provided by the engaged seal surfaces 22 and 23 prevents entry of fluids from an area A externally of the connection into the annular gap 30 to protect the pin threads from the effects of corrosion.

An axial end 32 of the pin 13 engages a shoulder 33 formed internally of the coupling 12 to provide a seal precluding the entry of fluids from an area B within the pipe sections into the threaded area between the pin and box. It will thus be appreciated that the threaded area of the pin and box in the connector 10 is isolated from contact with corrosive fluids that may be externally or internally in contact with the connector.

With reference to FIG. 2, an important aspect of the described form of the present invention is that the seal surface 23 is formed within an external cylindrical surface 34 forming the nominal outside diameter of a major portion of the pipe section 15. The threads 25 on the pin 13 run out on a cylindrical surface 35 having a diameter no greater than the nominal diameter of the pipe surface 34. The illustrated design of FIGS. 1 and 2 permits the use of non-upset pipe for the pin construction and eliminates the requirement to weld or otherwise affix a large tubular end piece to the pipe section in order to secure a connector that can withstand the effects of dynamic loading in a corrosive environment.

Figure 3:
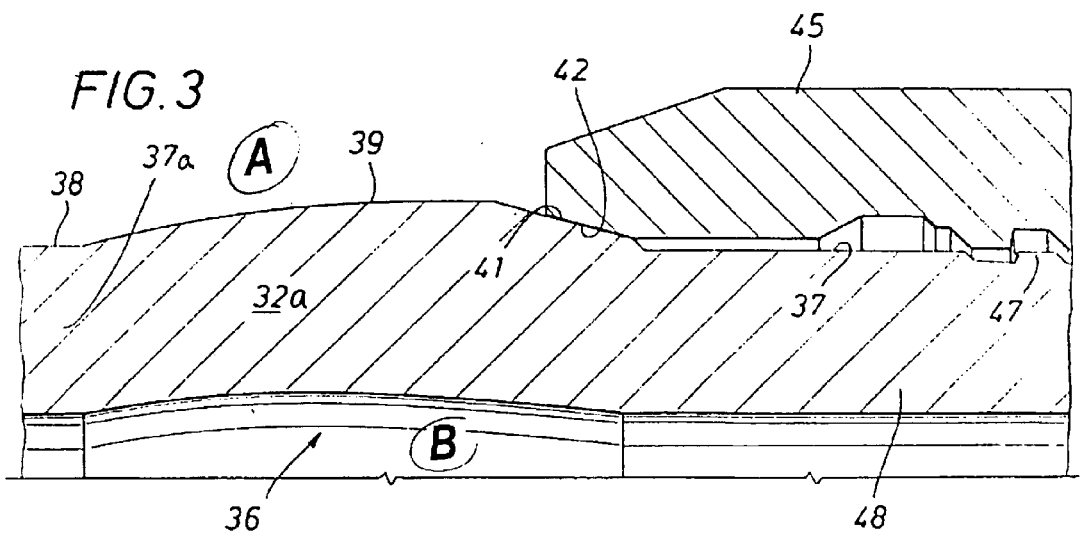
FIG. 3 is an enlarged cross sectional view of a modified metal-to-metal external seal of the connector of the present invention illustrating an enlarged pin section providing a portion of a metal-to-metal seal.

FIG. 3 of the drawings illustrates a modified form of the present invention indicated generally at 36 in which a pipe section 37a with a nominal outside diameter indicated at a cylindrical surface 38 is enlarged to have an outside diameter depicted at 39 to provide a shoulder 41 for a seal surface 42 of a box 45.

A feature of the embodiment of FIG. 3 is that threads 47 on a pin 48 are permitted to run out on the outside diameter of the cylindrical surface 38 which is the same as the nominal outside diameter at 38 of the pipe section 37, permitting the thickness of the pin 48 of the tubular body to be increased as compared with the form of the invention illustrated in FIG. 1. Benefits of the design are that increased structural strength may be provided in the threaded area of the connection and the metal-to-metal seal is effected with at a significant increase in the amount of metal in the connection.

Another connector of the present invention is indicated generally at 50 in FIG. 4 of the drawings. The connector 50 includes a box 51 made up to a pin 53. Threads 54 formed internally of the box 51 engage and mate with threads 55 formed externally of the pin 53. An annular, elastomeric O-ring seal 57 is carried in an annular groove 58 formed along the external surface of the pin 53. The pin 53 is formed at the end of a pipe section 60 that has a nominal outside diameter indicated at the cylindrical surface 61. A load redirection groove 63 is formed on the external surface of the pipe section 60, decreasing in diameter from the nominal outside diameter area 61 to a reduced diameter indicated at 65.

The O-ring seal 57 engages a cylindrical internal surface 67 of the pin 51 to provide an external seal that prevents entry of fluids from the area A external to the connection into the box area defined between the box 51 and the pin 53. The load redirection groove 63 diverts the dynamically imposed forces acting against the connection away from the stress concentration area provided by the groove 58.

FIG. 5 of the invention illustrates a connector indicated generally at 70 provided with an internal, elastomeric O-ring seal 71 carried in a groove 73 formed within a box 75. The O-ring 71 seals against a cylindrical external surface 76 that is reduced in diameter from that of the nominal outside diameter of the pipe 79. The nominal outside diameter of the pipe 79 is indicated by the cylindrical surface 77. Threads 80 formed on a pin 81 run out onto a cylindrical surface 83 having a diameter less than that of the seal diameter of the surface 76.

The O-ring 71 cooperates with the surface 76 to provide an external seal that prevents entry of fluids from the area A external to the connection into the threaded area contained between the pin 81 and box 75.

A modified form the invention is illustrated in FIG. 6, indicated generally at 90. The connection 90 includes a coupling box 91 and a pin 92. An annular, elastomeric seal ring 93 is carried in an annular groove formed internally of the box 91. Pin threads 95 run out on a cylindrical surface 96 forming the nominal outside diameter of a pipe 97. The seal ring 93, which may be constructed of a polymer of polytetrafluoroethylene, such as Teflon® or other suitable material, is adapted to engage and seal with the threads 95 in the area of the last scratch of the threads. The seal ring 93 may be cut with an internal profile indicated at 98 permitting the pin and box to be threaded together without displacing the seal ring. The form of the coupling indicated in FIG. 6 permits machining of threads on a pin body having a substantially full depth wall to maximize the strength of the structural connection between the pin and box.

FIG. 7 of the drawings illustrates a form of the invention indicated generally at 100 in which an annular, elastomeric ring 101 is compressed between a fixed steel ring 102 and a face 103 of a box 104. While the steel ring 102 may be anchored to the pin by any suitable means, it is preferably secured through a heat shrink procedure. The ring 101 may be constructed of Teflon® or other suitable material. The compression of the ring 101 forms a seal between the box, the steel ring 102 and a reduced diameter section 106 of a pin 107. The threaded area of the pin is formed on the outside wall of the pin intermediate a nominal outside diameter section 108 of a pipe 109 and the pin end (not illustrated).

As with the previously Illustrated embodiments, the external seal of the connector 100 prevents corrosive fluids externally of the connection in the area A from entering into the threaded area contained between the pin and box.

FIG. 8 illustrates a modified form of the connector of the present invention indicated generally at 110. The connector 110 includes a pin 111 and a box 112. The pin 111 includes threads 114 that run out on a nominal outside diameter 115 of a pipe section 116. An annular, elastomeric ring 118, having a rectangular cross section, is cemented or otherwise suitably secured to the pin 111 on the outside diameter 115. The ring 118 may be constructed of rubber, Teflon® or other suitable sealing material. An internal, frustoconical seal surface 119 formed adjacent the face 120 of the coupling 112 is adapted to engage and compress the ring 118 to provide the external seal protecting the threads contained between the pin 111 and box 112.

FIG. 9 of the drawings illustrates a modified form of the invention indicated generally at 130. The connection 130 includes a pin 131, a box 132, pin threads 133 and box threads 134. The pin threads run out to a nominal outside diameter 136 of a pipe section 137.

A compression ring 140 is threadedly engaged with the box 132 by auxiliary threads 142 formed within the ring 140 and along the external surface of the end of the box 132. The auxiliary threads 142 are preferably straight threads rather than interference threads. The compression ring 140 includes an internal shoulder 145 that engages an annular seal ring 146 and compresses the seal ring against an end face 148 of the box 132. As the ring 140 is threaded onto the box 132, the compression ring shoulder 145 advances toward the box face 148 to compress the seal ring 146. Compression of the seal ring forms a seal with the outside diameter area 136 of the pin to provide a complete external seal isolating the threaded area between the pin and box from corrosive fluids contained in the area A externally of the connection. The external surface area indicated generally at 149, of the compression ring 140 is made sufficiently long, axially, to accommodate the power tools (not illustrated) employed to grip and turn the compression ring.

The end face of the compression ring forms a metal-to-metal seal, indicated a generally at 150a, with a frustoconical seal surface 151a formed on the external surface of the box. At the full makeup position of the compression ring with the box 132, the metal-to-metal seal 150a and the seal ring seal 146 prevent contact of corrosive fluids with the threads 142.

FIG. 10 of the drawings illustrates a form of the connector of the present invention indicated generally at 150. The connector 150 includes a box 151, a pin 152, pin threads 153, and box threads 154. The pin threads 153 runout on an external, cylindrical surface indicated at 156 representing the nominal outside diameter of a pipe section 157. A compression ring 160 is secured to the external surface of the pin 151 with mating threads 161 that are formed internally of the ring 160 and externally of the box 151. An elastomeric seal ring 163 is positioned between an internal compression ring shoulder 164 and an end face 165 of the box 151. Rotation of the compression ring advances the ring along the threads 161 to compress the compression ring 163 providing an external seal protecting the threads 153 and 154 between the pin and box. A crush ring 167 is compressed between the end of an internal, frustoconical compression ring seal surface 168 and an external box shoulder 169.

Compression of the ring 163 forms a seal between the box end 165, the compression ring shoulder 164 and the nominal outside pipe diameter of the pipe 157 to protect the coupling and pin threads from exposure to corrosive fluids external to the connection in area A. The seal ring 163 and the crush ring 167 protect the auxiliary threads 161 from contact with external fluids in area A.

FIG. 11 of the drawings illustrates a modified form of the invention indicated generally at 180. The connection 180 includes a pin 181, a box 182, pin threads 183, and box threads 184. Compression ring 186 is carried over a nominal outside diameter indicated at 187 of a pipe section 188. The compression ring 186 is threadedly secured to the end of the box 182 by auxiliary threads 190 formed internally of the box and externally of the ring.

Threaded advancement of the compression ring 186 into the box 182 compresses an annular seal ring 191 between a ring end surface 192 and an internal box shoulder 193 formed at the base of the auxiliary threads 190. Compression of the seal ring 191 creates seals with the nominal outside diameter surface 187 and the box 182 to protect the threads 183 and 184 from corrosive fluids external to the connection in an area A. A face seal 195 at the end of the box 182 mates with a compression ring shoulder 196 to provide a metal-to-metal seal that cooperates with the seal ring 191 to prevent fluids external to the connection from contacting the auxiliary threads 190.

While preferred forms of the present invention have been described in detail herein, it will be appreciated that other forms, modifications and variations of the present invention may be made without departing from the spirit or scope of the invention, which is more fully defined within the terms of the following claims.

What is claimed is:

1. A connector for connecting together the free pin end and the free box end of two tubular bodies, comprising:

a pin having pin threads formed externally on an end of a first tubular body, said pin threads extending from a starting point on said first tubular body and terminating adjacent the free pin end, said pin threads further being formed on a tubular section of said first tubular body having an outside diameter no greater than an outside diameter of a major length of said first tubular, said pin threads running out on said outside diameter at said starting point, a box having box threads formed internally on an end of a second tubular body, said box threads extending from a starting point on said second tubular body and terminating adjacent the free box end, said pin adapted to be received in and threadedly engaged with said box, an external seal between said pin and said box adjacent said pin thread starting point and adjacent said free box end, said external seal comprising an annular, elastomeric seal disposed against said pin and said box and wherein said external seal is an annular, elastomeric seal ring carried externally of said first tubular and adapted to engage a face formed at an axial end of said box, and said seal ring is retained axially and positioned between said face and a back up ring secured to said pin, and an internal seal adjacent said box thread starting point and said free pin end whereby said pin threads and said box threads are at least partially confined between said external and internal seals when said pin and box are engaged.

2. A connector for connecting together the free pin and the free box end of two tubular bodies comprising:

a pin having pin threads formed externally on an end of a first tubular body, said pin threads extending from a starting point on said first tubular body and terminating in the area of the free pin end, a box having box threads formed internally on an end of a second tubular body, said box threads extending from a starting point on said second tubular body and terminating in the area of the free box end, a pin adapted to be received in and threadedly engaged with said box, an external seal between said pin and said box adjacent said pin thread starting point and adjacent said free box end, said external seal comprising an annular, elastomeric seal disposed against said pin and said box, an internal seal adjacent said box thread starting point and said free pin end whereby said pin threads and said box threads are at least partially confined between said external and internal seals when said pin and box are engaged, compression ring threads formed in the area of said free end of said box, a threaded, annular compression ring encircling said first tubular body and adapted to threadedly engage said compression ring threads, and an annular, elastomeric seal ring disposed between said compression ring and said box whereby threaded engagement of said compression ring with said box forms said external seal.

3. A connector as defined in claim 2 wherein compression ring threads are formed on an external surface of said box.

4. A connector as defined in claim 2 wherein compression ring threads are formed on an internal surface of said box.

5. A connector as defined in claim 2 wherein said compression ring engages said box to form a metal-to-metal seal whereby said compression ring threads are disposed between said elastomeric seal ring and said metal-to-metal seal.

6. A connector as defined in claim 2 further including an annular, elastomeric crush ring axially displaced from said seal ring and adapted to be compressed between said compression ring and said box whereby said compression ring threads are disposed between said seal ring and said crush ring when said compression ring is engaged with said box.

7. A connector for connecting together the free pin end and the free box end of two tubular bodies comprising:

a pin having pin threads on an end of a first tubular body, said pin threads extending from a starting point on said first tubular body and terminating adjacent the free pin end, said pin threads further being formed on a tubular section if said first tubular body having an outside diameter no greater than an outside diameter of a major length of said first tubular, said pin threads running out on said outside diameter at said starting point, a box having box threads formed internally on an end of a second tubular body, said box threads extending from a starting point on said second tubular body and terminating adjacent the free box end, said pin adapted to be received in and threadedly engaged with said box, an external seal between said pin and said box adjacent said pin thread starting point and adjacent said free box end, said external seal comprising an annular, elastomeric seal disposed against said pin and said box, an internal seal adjacent said box thread starting point and said free pin end whereby said pin threads and said box threads are at least partially confined between said external and internal seals when said pin and box are engaged and wherein said external seal is an annular, elastomeric seal ring carried externally of said first tubular and adapted to engage a face formed at an axial end of said box, and wherein said seal ring is retained axially and positioned between said face and a back up ring secured to said pin.

* * * * *